United States Patent

Fei

[11] Patent Number: 5,825,111
[45] Date of Patent: Oct. 20, 1998

[54] SINGLE-PHASE INDUCTION MOTOR 4/6 POLE COMMON WINDING CONNECTION WITH MAGNETIC MOTIVE FORCE SYMMETRICALLY DISTRIBUTED

[75] Inventor: Renyan W. Fei, St. Louis, Mo.

[73] Assignee: Emerson Electric Co., St. Louis, Mo.

[21] Appl. No.: 745,454

[22] Filed: Nov. 12, 1996

[51] Int. Cl.⁶ .................................................. H02K 3/00
[52] U.S. Cl. .......................... 310/179; 310/180; 310/184; 310/191; 318/224; 318/776
[58] Field of Search ...................... 310/179, 184, 310/180, 191; 318/224, 223, 776

[56] References Cited

U.S. PATENT DOCUMENTS

| | | | |
|---|---|---|---|
| 1,795,063 | 3/1931 | Weichsel | 318/221 |
| 1,859,368 | 5/1932 | Kennedy | 310/184 |
| 1,859,369 | 5/1932 | Kennedy | 310/184 |
| 2,813,239 | 11/1957 | La Cour . | |
| 2,896,144 | 7/1959 | Mollenberg | 310/184 |
| 3,619,730 | 11/1971 | Broadway et al. | 318/224 |
| 3,673,477 | 6/1972 | Broadway et al. | 318/224 |
| 3,826,960 | 7/1974 | Broadway et al. | 318/223 |
| 4,100,444 | 7/1978 | Boyd | 310/184 |
| 4,103,212 | 7/1978 | Spradling | 318/224 |
| 4,103,213 | 7/1978 | Landgraf | 318/224 |
| 4,221,999 | 9/1980 | Gausman, Jr. | 318/704 |
| 4,322,665 | 3/1982 | Landgraf | 318/774 |
| 4,463,303 | 7/1984 | Kirschbaum | 318/776 |
| 4,473,788 | 9/1984 | Kirschbaum | 318/776 |
| 4,476,422 | 10/1984 | Kirschbaum | 318/776 |
| 4,635,349 | 1/1987 | Rabe | 29/596 |
| 4,886,990 | 12/1989 | Barker . | |
| 4,937,513 | 6/1990 | Hoemann et al. | 318/772 |
| 5,668,429 | 9/1997 | Boyd, Jr. et al. | 310/254 |

*Primary Examiner*—Steven L. Stephan
*Assistant Examiner*—Tran N. Nguyen
*Attorney, Agent, or Firm*—Polster, Lieder, Woodruff & Lucchesi

[57] ABSTRACT

A single phase alternating current four pole/six pole capacitor run induction motor is provided having a stator assembly including three coil groups, each of the coil groups having four coil sets. Each of the winding sets can change the direction of current flow in its half of the coil sets by reconnecting the coil sets either in parallel or in series. For high speed operation, the coil sets of group one are connected parallel with one another, and in series with the similarly parallel connected coil sets of group two. This arrangement defines a four pole main winding for the motor. A pair of the coil sets of group three are connected in parallel with one another, and defines the four pole auxiliary winding for the motor. In six pole operation, the coil sets of group one 1 are connected in series to parallelly connected coil sets of group three to define the six pole auxiliary winding. The serially connected winding group two is in series with half of the parallelly connected coil sets of winding group three, thereby defining the six pole main winding for the motor. As a result, all coils of the windings are shared by both operations. At both speeds, the main and auxiliary magnetic motive forces are symmetrically distributed and have a ninety electrical degree phase shift in space. The performance at either speed of the motor closely simulates that provided by a single speed capacitor run motor of the same size.

27 Claims, 5 Drawing Sheets

SINGLE-PHASE INDUCTION MOTOR 4/6 POLE COMMON WINDING CONNECTION WITH MAGNETIC MOTIVE FORCE SYMMETRICALLY DISTRIBUTED

CROSS-REFERENCE TO RELATED APPLICATIONS

STATEMENT REGARDING FEDERALLY SPONSORED RESEARCH OR DEVELOPMENT

Not Applicable.

BACKGROUND OF THE INVENTION

This invention relates to a permanent split capacitor (PSC) motor design and, in particular, to a PSC motor finding application in a drive system for the agitator of an automatic washing machine. While the invention is described with particular detail with respect to such application, those skilled in the art will recognize the wider applicability of the inventive principles disclosed hereinafter.

PSC motors have been used to drive washing machines since antiquity. The motors themselves have been known since nearly the birth of induction motors. Likewise, washing machines are not new. Over the years, many attempts have been made to simplify drive mechanisms employed to drive the agitator and spin-wash baskets of automatic washers. A number of motor types have been employed for this purpose, including both induction motors and direct current motors of various constructions. Most recently, brushless permanent magnet motors and electronically controlled motors have been suggested for use in washing machines. While these later motor constructions work for their intended purpose, both brushless permanent magnet motors and electronic controlled motors require expensive and sophisticated electronic control circuitry for operation, which adds significant cost to the product. Consumers generally have been unwilling to accept the added cost.

On the other hand, reversing PSC motors capable of high reversal repetition rates also are known in the art. For example, the U.S. Pat. No. 4,886,990 to Barker, issued Dec. 12, 1989, and assigned to the assignee of the present invention, discloses a specifically designed reversible split capacitor motor capable of high reversal repetition rates to provide the agitation motion for a washing machine. The specification of U.S. Pat. No. 4,886,990 is intended to be incorporated herein by reference.

While the motor disclosed in the '990 patent also works well for its intended purpose, it is a single speed motor. Motor manufacturers, and their OEM customers, still are seeking a low cost motor design which provides greater flexibility than a single speed motor, but does not require the complicated, expensive, and sophisticated electronic control circuitry required by brushless permanent magnet motors in equivalent applications.

Multi-speed permanent split capacitor motors also are known in the art. For example, in washing machines, a high speed (four pole) winding often is used for a regular wash and a low speed (six or eight pole) winding is used for permanent press or delicate wash. Conventionally in such two speed motors, two independent windings, a four pole winding and a six pole or eight pole winding, are used. It also is known to use consequent pole constructions for such motors. However, in such motors, only part of the windings are used in one of the winding connections. Even if the entire winding is used, the magnetic motive force distribution often is not symmetrical, which detracts from motor performance.

The motor of the present invention, described more fully hereinafter, overcomes these difficulties and provides solutions to the problems of the prior art by disclosing a motor which utilizes the entire winding configuration of the motor in all winding connection schemes of the motor, and does so while providing symmetrical magnetic motive force distribution.

One of the objects of this invention is to provide a low cost PSC motor design which offers improved operating capabilities.

Another object of this invention is to provide a two-speed motor design which utilizes all of the windings of the motor for each speed.

Another object of this invention is to provide a PSC motor which is reversible in at least one of the operational speeds.

Another object of this invention is to provide a PSC motor having improved operational characteristics.

Other objects of this invention will be apparent to those skilled in the art in view of the following description and accompanying drawings.

BRIEF SUMMARY OF THE INVENTION

In accordance with this invention, generally stated, a permanent split capacitor motor includes a stator core and a winding positioned on the core. A switch assembly is connected to the windings. The windings are arranged so that operation of the switch assembly enables the motor to provide four pole operation in one position of the switch assembly and six pole operation in another operating position of the switch assembly. The motor is reversible in at least one of the operational modes. In each mode of operation, the entire winding is utilized, and the magnetic motive force generated by the winding is generally symmetric for both four pole and six pole operating positions of the switch.

DETAILED DESCRIPTION OF THE INVENTION

Figure 1:
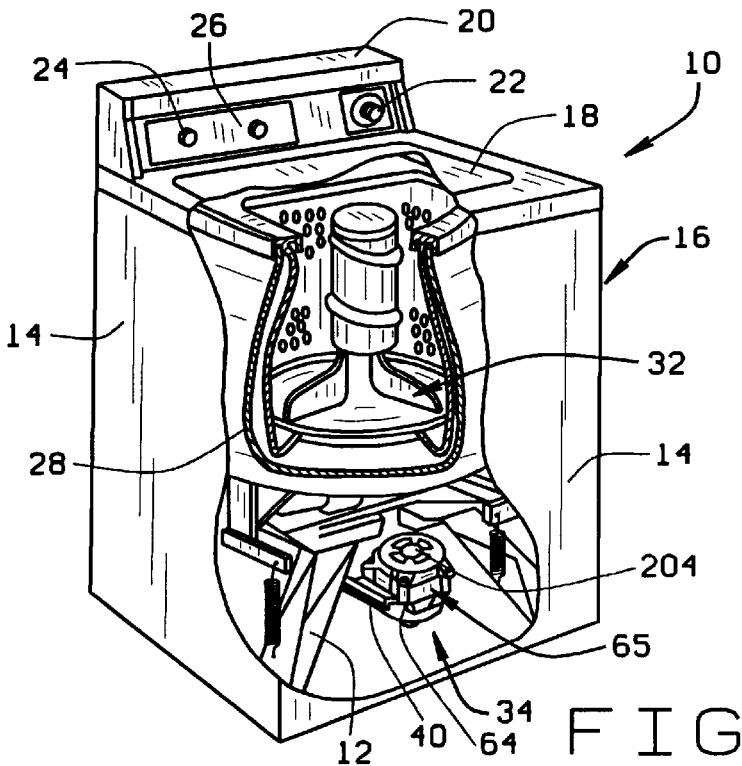
FIG. 1 is a view in perspective, partly broken away, depicting an automatic washing machine utilizing the motor of the present invention.

Referring now to FIG. 1, reference 10 generally indicates a vertical axis agitator type washing machine having pre-selectable controls for automatically operating the machine through a program series of washing, rinsing and spinning steps. The machine 10 includes a frame 12 carrying panels 14 which form the sides, top, front, and back of a cabinet 16. A hinged lid 18 is provided in the usual manner for access to the interior of the washing machine 10. In the embodiment illustrated, the washing machine 10 has a rear console 20, in which is disposed settable control means, including a timer dial 22, a temperature selection 24, and a switch assembly 26. The switch assembly 26 is both illustrated in FIG. 5 and later described in greater detail. When the timer associated with dial 22 has extra contacts, the timer can take over the functions of switch assembly 26. Other controls may be provided, if desired.

Internal to the washing machine 10 is a perforated fluid containing tub 28 within which is rotatably mounted a perforated basket 30. A vertically disposed agitator 32 is connected for operation to a motor 34 through a drive mechanism 36.

Figure 2:
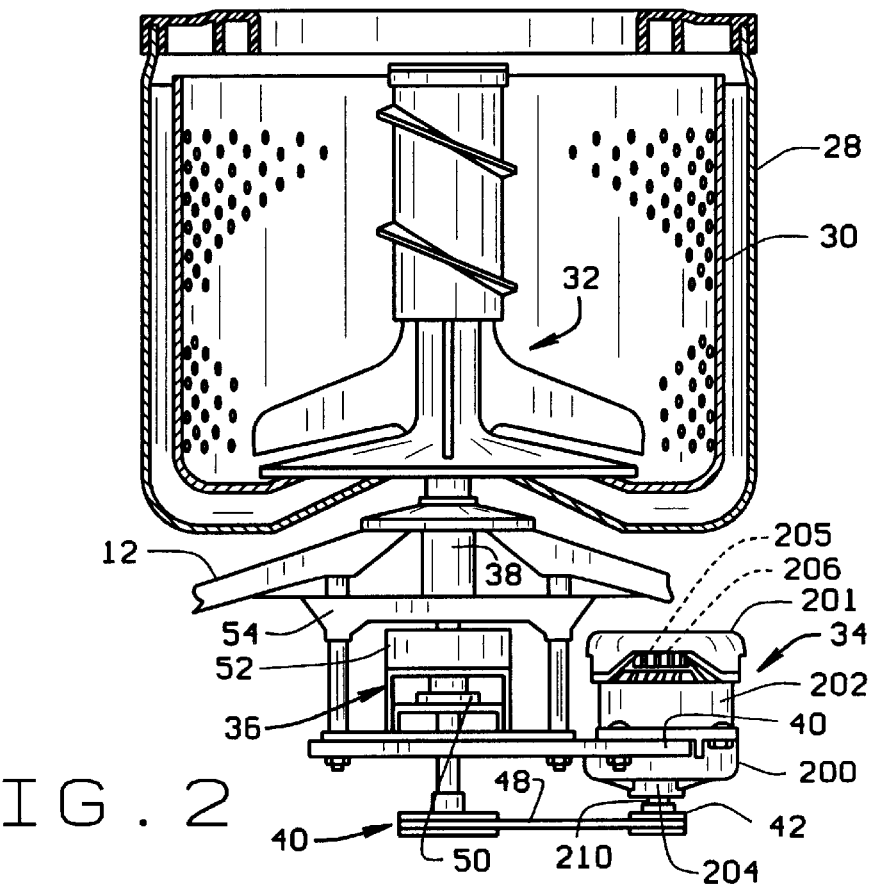
FIG. 2 is a cross sectional view of a portion of the automatic washer shown in FIG. 1.

Referring now to FIG. 2, the agitator 32 is linked by a drive shaft 38 to the drive mechanism 36, which, in turn, is driven by a suitable pulley arrangement 40 and 42. As indicated, the motor 34 is linked to the pulley arrangement of 40–42. That arrangement, a drive pulley 41 and a driven pulley 42, are connected to one another by a belt 48. The drive mechanism 36, in the embodiment illustrated, also includes a planetary gear drive having a spring clutch 50 in a planetary housing 52 mounted in a reduction drive frame 54 that connects to the frame 12 in any convenient manner. While the planetary reduction drive has been shown in the drawings and disclosed herein for use with the motor 34 of the present invention, those skilled in the art will recognize that a variety of other drive arrangements are suitable for use with the motor 34. For example, those skilled in the art will recognize that the motor 34 may be directly attached to the agitator in operation of the washing machine 10. Those skilled in the art also will appreciate that the washing machine 12 is described merely for background information purposes, and that the machine 10 itself may comprise any of a variety of commercially available devices of both the top loading type described, and front loading, horizontally positioned tub constructions, all as are well known in the art.

The motor 34 includes a first end shield 200 and a second end shield 201 which are attached to a stator assembly 202 in any conventional manner. Threaded fasteners work well, for example. The end shields 200 and 201 respectively include a central hub 204, which houses suitable bearings 206 for rotatable support in a rotor assembly 205. The rotor assembly 205 is mounted on a shaft 210. The shaft 210, in turn, is journaled in the bearings 206. The rotor assembly 205 is mounted on the shaft 210 by any convenient method. Shrink or press fits work well, for example.

In general, the motor 34 may be constructed in accordance with any common construction features well known in the art. For example, the stator assembly 202 conventionally is constructed from a plurality of individual laminations 64 assembled to form a core 65. The individual lamination design is not shown for the sake of simplicity, but the laminations 64 and core 65 are diagrammatically illustrated in FIG. 3. The core 65 conventionally includes a yoke portion, not shown, and a plurality of radially extending teeth 66, which again are diagrammatically illustrated in FIG. 3. The teeth 66 define a central bore 67 which receives the rotor assembly 205 in a conventional manner. In the embodiment illustrated, the teeth 66 define winding receiving slots 68, which open on the bore 67 and are closed at their radially outwardly end 69. In the embodiment illustrated, core 65 has thirty-six of the slots 68 formed in it. A winding 80 is carried by the core 65 and positioned in the slots 68. Other lamination designs are compatible with my invention.

The rotor assembly 205 preferably also is a laminated structure having a squirrel cage design. The stator core and rotor constructions, per se, do not form a part of the invention and are not described in detail.

The winding 80 includes a first coil group 82, a second coil group 83, and a third coil group 84. Each of the coil groups 82, 83, and 84, in the embodiment illustrated, are constructed from four coil sets, respectively indicated as 90, 91, 92, and 93; 90', 91', 92' and 93'; and 90", 91", 92" and 93". As will be appreciated by those skilled in the art, each of the coil sets are formed from a plurality of turns of magnet wire wound by any convenient method. The term "magnet wire" refers to electrically conductive material conventionally coated with at least one layer of insulative material. Commonly, the electrically conductive material is copper or aluminum. Other materials are compatible with the broader aspects of my invention.

As indicated above, in the preferred embodiment, the core 65 is constructed from a 36 slot lamination. Each slot preferably has the same slot area. Each of the coil sets 90, 91, 92, and 93 are distributed over six and four teeth. Coils that span four teeth have half of the number of turns as the coils spanning six teeth. Preferably, the coil group 82 is positioned or placed in the bottom of the slots 65.

Figure 5:
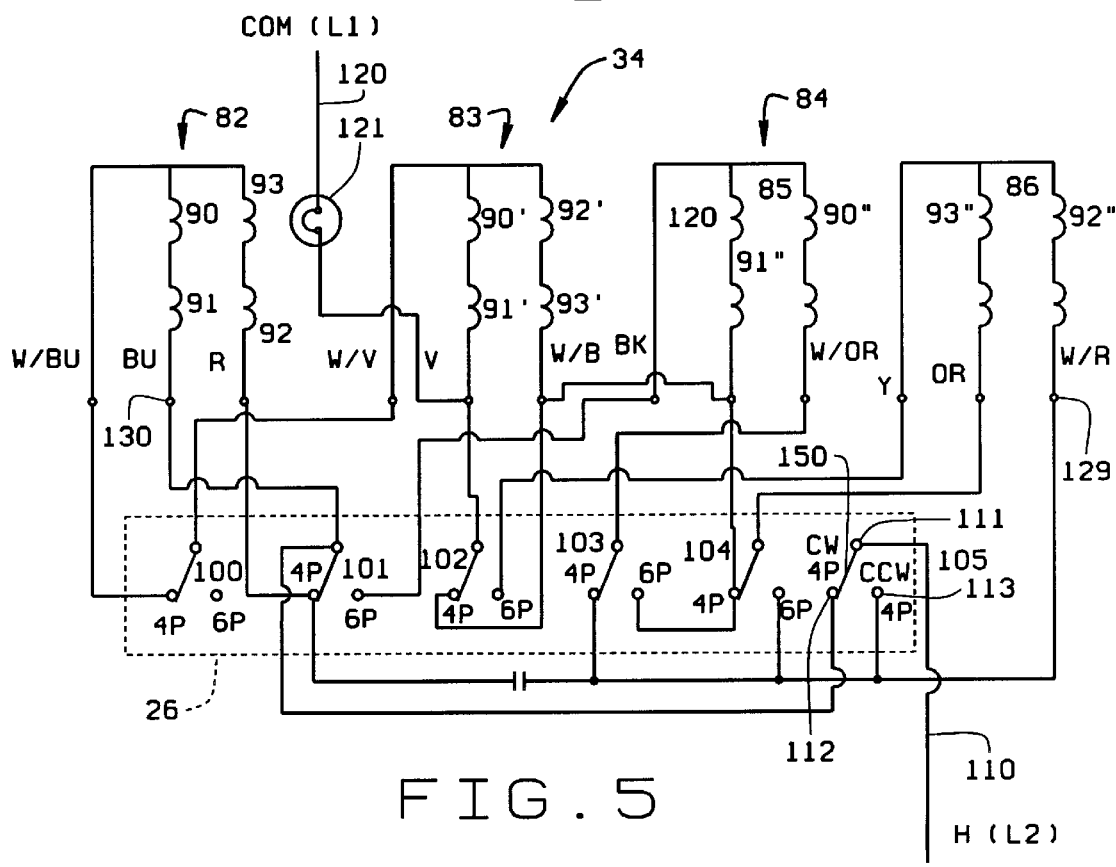
FIG. 5 is a diagrammatic view of the motor and the switch assembly of the present invention.

The winding group 83 is the intermediate winding of the three illustrated. The winding group 83 is shifted twenty degrees physically with respect to the coil group 82. The coil group 83 also is distributed over six and four teeth. The wire size and the number of turns of the coil group 83 are identical to that of the coil group 82. The coil sets of the third coil group 84, however, are wound over nine, seven, and three teeth respectively. All three coil sets have the same number of turns as the coil set which span six teeth of the coil groups 82 and 83. The wire size of the third coil group 84 is half of the wire size used for coil groups 82 and 83. As best seen in FIG. 5, coil group 84 is constructed so that it includes a winding part 85 and a winding part 86.

Switch assembly 26, also shown in FIG. 5 has six switches 100 to 105 associated with it. The switches 100 to 105 are single-pole, double-throw switches of conventional design. Other switch mechanisms may be employed, if desired. For example, the switches may either be mechanical or electronic switches.

A line lead 110 is connected to the switch arm 150 of switch 105 at a terminal 111. Switch 105 only has four pole motor operations associated with it. That is to say, the switch positions include a four pole clockwise rotation position 112 and a four pole counter clockwise position 113. The other switches 100 through 104 have respective four pole and six pole positions and are not described in detail. The arrangement shown in FIG. 5 is connected for the clockwise four pole run position of the motor 34. When all of the switches 100–104 are in their four pole positions, operation of the switch 105 causes the motor 34 to operate in either clockwise or counter clockwise directions. As will be appreciated by those skilled in the art, continuous reversal of the switch 105 positions corresponds to the agitation operation of a washing machine, for example. For proper motor operation, when the switches 100–104 are in their six pole positions, the switch 105 is set to the four pole clockwise position shown in FIG. 5.

Figure 4A:
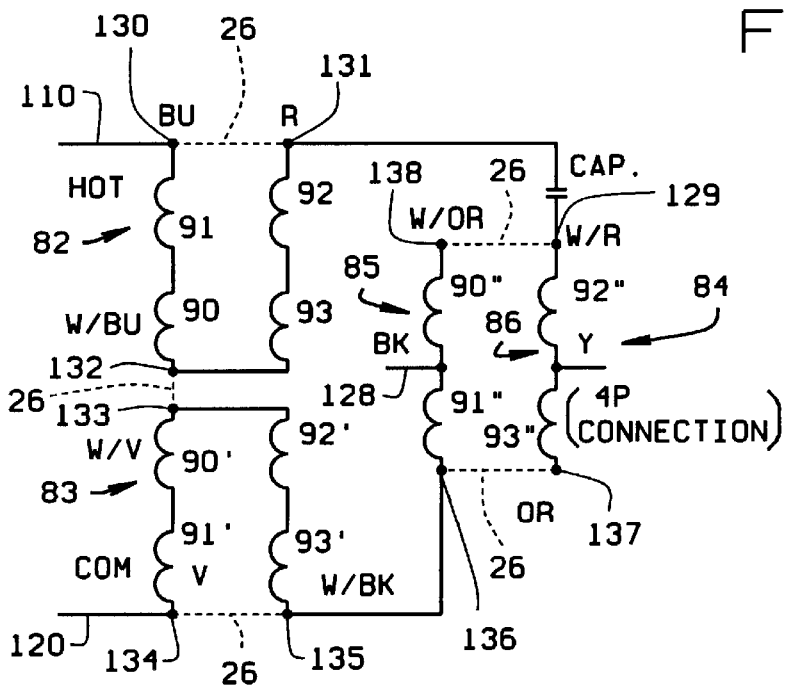
FIG. 4a is a diagrammatic view of the winding connections employed for four pole operation.
Figure 4B:
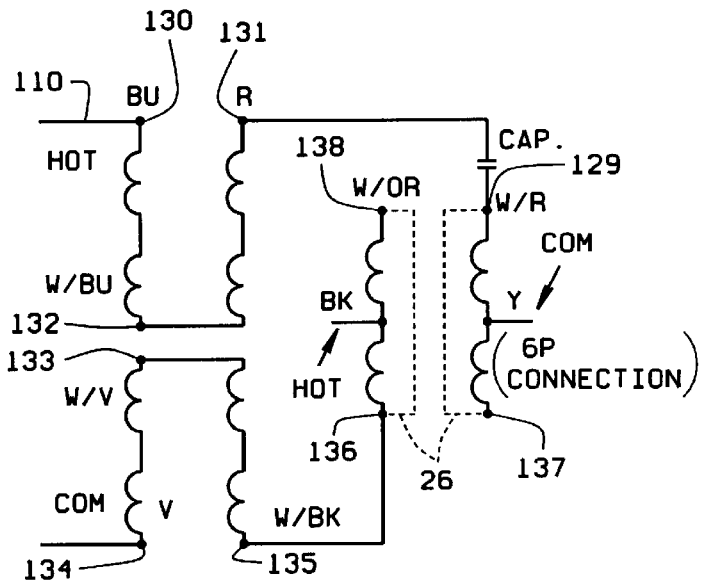
FIG. 4b is a block diagrammatic view of the winding configuration employed for six pole operation.

Operation of the motor 34 of this invention and its various connections is best understood with reference to FIGS. 4a and 4b. The various connections are denominated as White/Blue (W/Bu), Blue (Bu), Violet (V), White/Black (W/Bk), White/Violet (W/V), Orange (Or), Black (Bk), White/Orange (W/Or), White/Red (W/R), Red (R), and Yellow (Y). FIG. 4a shows the four pole connection and FIG. 4b shows the six pole connection. The dash lines shown in FIGS. 4a and 4b indicate that the switch assembly 26 makes the dash line connections for the particular mode of operation of the motor 34. As shown in FIG. 4a, the lead 110 is connected to one end to the coil set 91 at connection point 130. The lead 110 also is connected through the switch assembly 26 to a red lead at connection point 131 at one end of the coil set 92. A second end of coil set 91 is connected to one end of coil set 90. The second end of coil set 90 is connected to the coil set 93, at a connection point 132, and through the switch 26 to a first end of the coil set 90' of coil group 83. The second end of coil set of 90' is connected to one end of coil set 91'. The second end of coil set 91' is connected to the lead 120, at connection point 134 and through the switch 26 to an end coil set 93' at a connection point 135. Coil set 93' is connected to coil set 92' at a first end of coil set 92'. The second end of coil set of 92' is electrically connected to coil set 90' at the connection point 133. The white/black connection from the coil set 93' is connected to one end of coil set 91" of coil group 84 at connection point 136. The same end of coil set 91" is connected through switch assembly 26 to a first end of coil set 93" at connection point 137. A second end of coil set 91" is connected to a black lead 128 which in turn is connected back to the switch assembly 26. The coil set 90' is connected through the switch assembly 26 to a white/red lead at a connection point 129 and to the connection point 130. The switch assembly 26 makes the connection between the connection point 130 and the connection point 131. Switch assembly 26 also makes the connection between connection point 132 and the connection point 133 134 and 135, 136 and 137, and between 138 and 139 as shown in FIG. 4A. Makes a connection between connection point 134 and connection point 135, between connection points 136 and 137, and between connection points 138 and 129, all of which are shown in FIG. 4a.

For a six pole operation, the switch opens the connection points 130, 132 and 134, and reconnects point 138 with connection point 136, and connection point 129 with connection point 137, as diagrammatically illustrated in FIG. 4b.

Figure 3A:
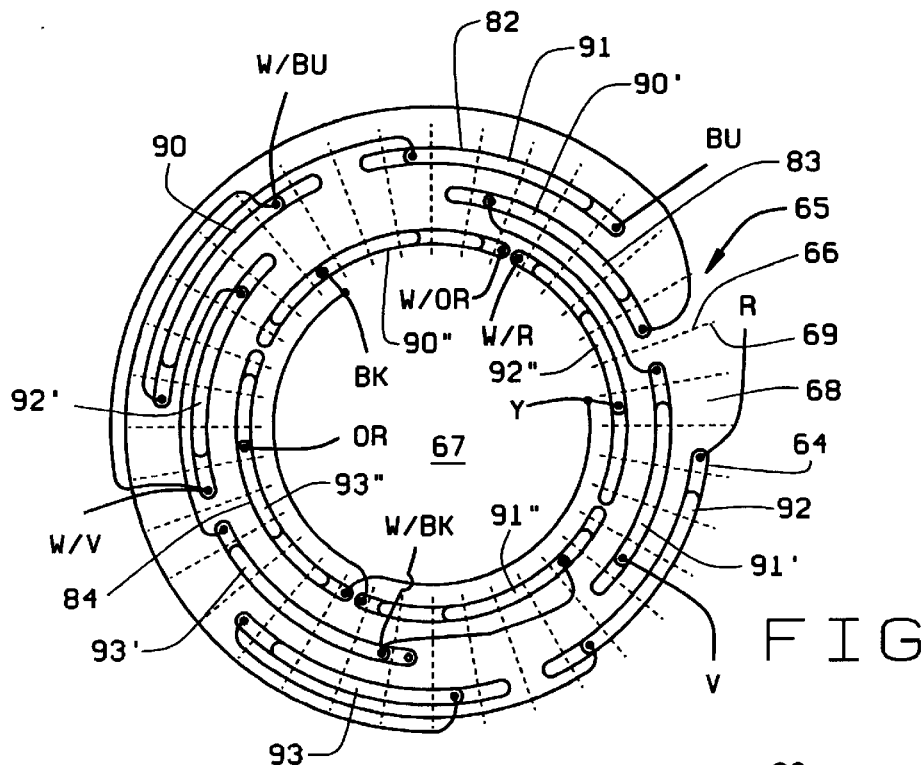
FIG. 3 is a diagrammatic view of one illustrative embodiment of the winding arrangement employed with the motor of the present invention.
Figure 3B:
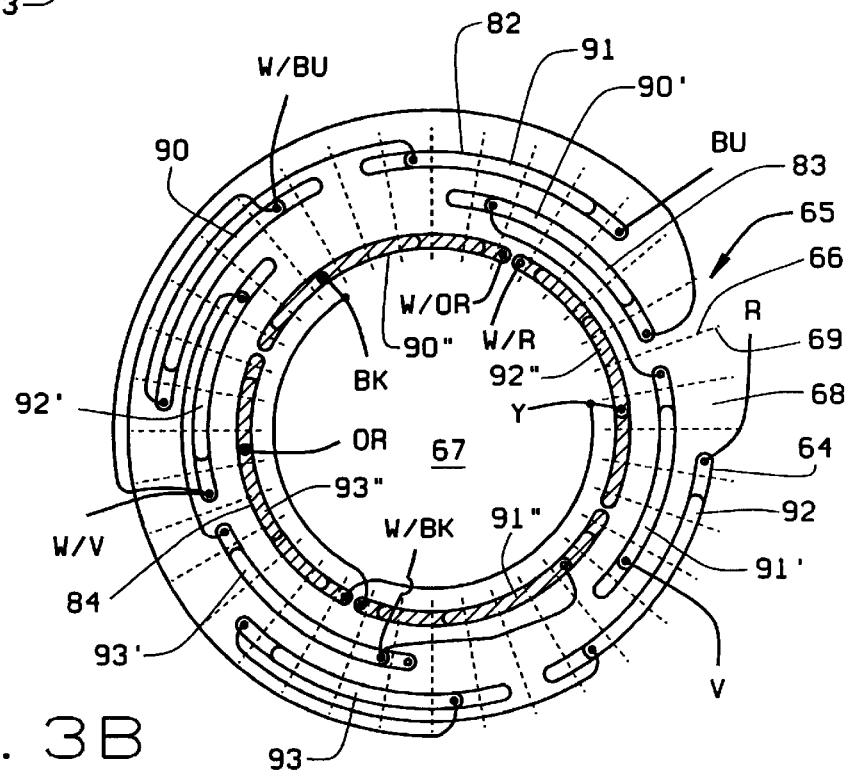
Figure 3C:
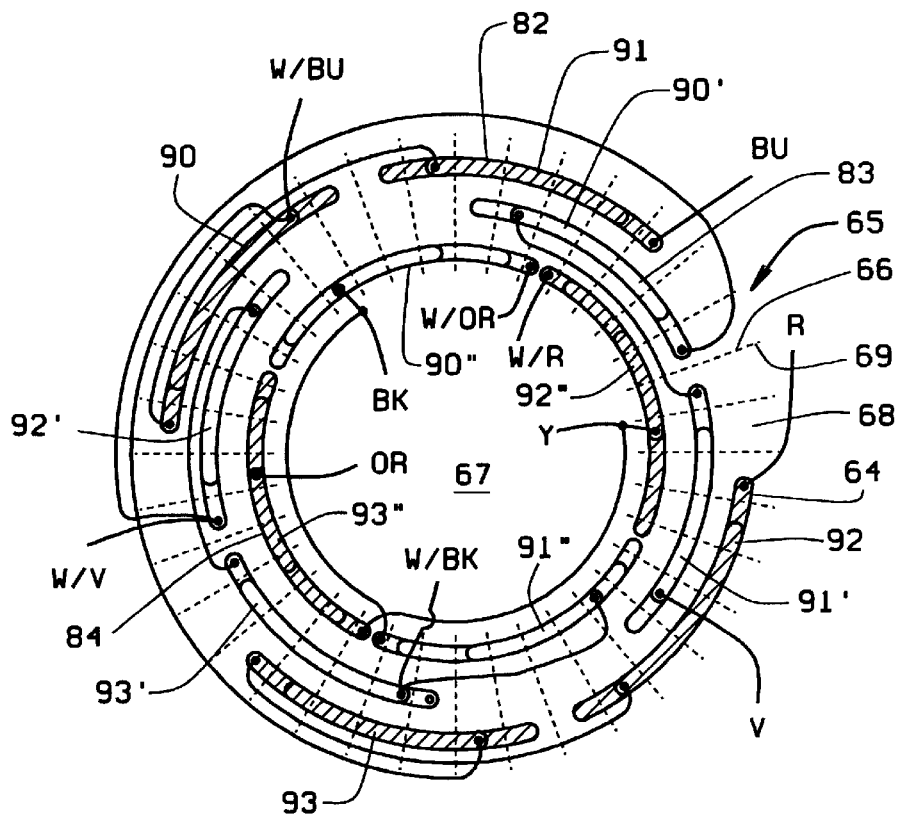
Figure 6:
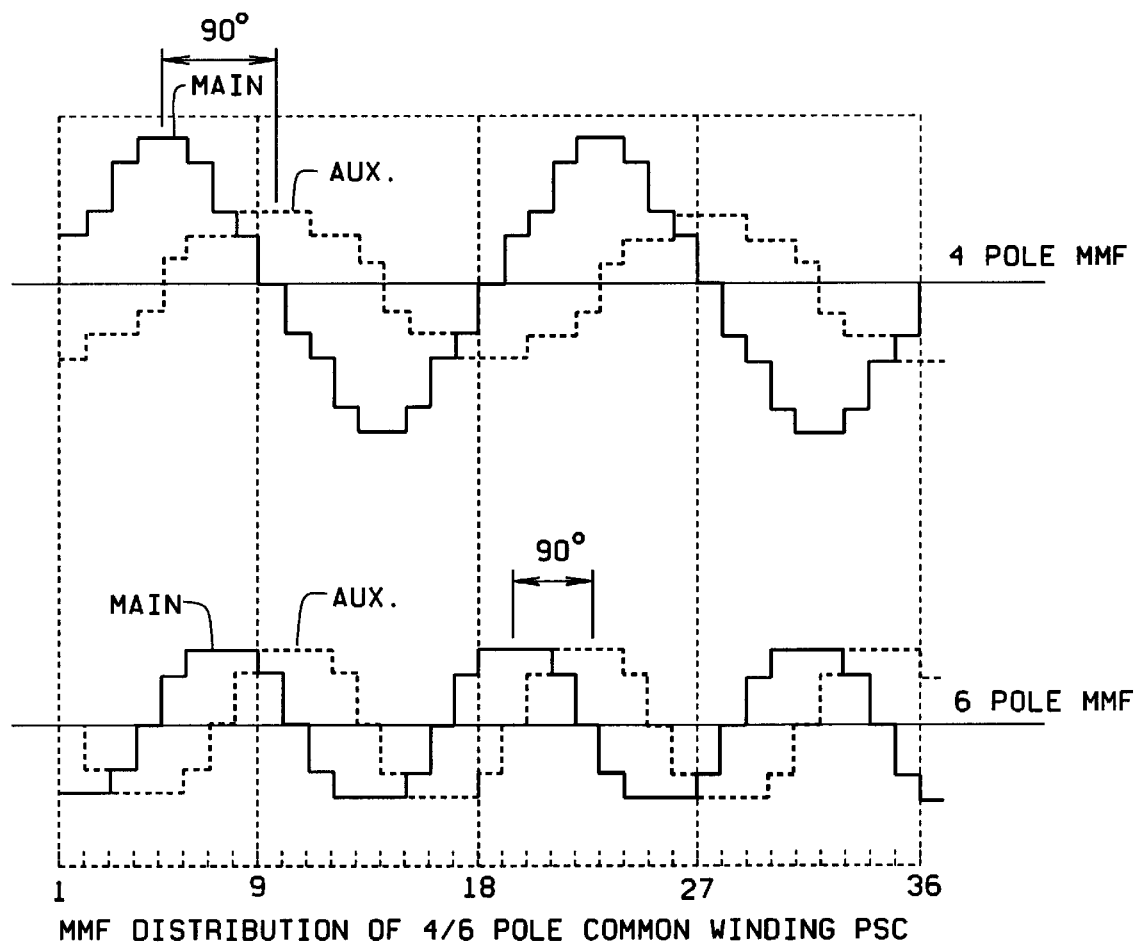
FIG. 6 are views illustrating the magnetic motive force of the motors in four pole and six pole operation.

FIG. 6 is a diagrammatic view of the magnetic motive force obtainable with four and six pole motor operation across the 36 slot stator illustrated in conjunction with FIG. 3. As observable in FIG. 6, substantially symmetrical distribution is obtained with the motor of this invention. This is accomplished with an economical motor design that can be constructed with conventional motor manufacturing techniques.

Numerous variations, within the scope of the appended claims, will be apparent to those skilled in the art in light of the foregoing description and accompanying drawings. Thus, while the motor has been described in conjunction with its application in a washing machine, those skilled in the art will recognize the wider applicability of the inventive principles. The motor is compatible with other applications. Constructional techniques not specifically described in conjunction with the stator assembly and the rotor assembly all are conventional. It being understood that specific motor constructions are not part of my invention, and that the lamination designs may be altered if desired. These variations are merely illustrative.

Having thus described the invention, what is desired to be secured by Letters Patent is:

1. An electric motor system comprising:
   a pair of line terminals for connection to an external source of power;
   a stator core;
   a first winding coil group disposed in magnetic coupling relationship with said core, said first winding coil group including four coil sets;
   a second winding coil group disposed in magnetic coupling relationship to said core, said second winding coil group including four coil sets;
   a third winding coil group disposed in magnetic coupling relationship with said core, said third winding coil group including four coil sets; and
   a switch assembly operatively connected to said first, said second, and said third winding coil groups so as to change current flow direction in selected ones of said coil sets to provide a four pole main operation and a four pole auxiliary winding operation in one connection, and a six pole main and a six pole auxiliary winding in another interconnection, said coil sets and connections being arranged so that the main winding and auxiliary winding magnetic motive forces are symmetrically distributed in both four pole and six pole modes of operation.

2. The electric motor system of claim 1, wherein said four pole motor connection direction of rotation of a rotor is reversible.

3. The electric motor system of claim 1, wherein said six pole motor operation is unidirectional.

4. The motor system of claim 1, wherein said stator core is constructed from a plurality of laminations, said laminations having a plurality of teeth, and wherein individual coil sets of said first and second winding coil groups are wound over six and four teeth respectively.

5. The motor system of claim 4, wherein the individual coil sets of said third coil group are wound over nine, seven, and three teeth, respectively.

6. The motor system of claim 5, wherein said stator core has thirty-six slots formed in it.

7. The motor system of claim 2, wherein said electric motor system is applied to a washing machine, the four pole reversing connection corresponding to the agitation cycle for said washing machine.

8. The motor system of claim 7, wherein said washing machine has a control panel, and said switch assembly is incorporated in said control panel.

9. The motor of claim 8, wherein said switch assembly includes a plurality of electronic switches.

10. A permanent split capacitor motor comprising;
   a pair of input lines for connecting said motor to a source of electrical power;
   a stator core having a plurality of winding receiving slots formed in it;
   a winding in said slots, said winding including a plurality of first coil sets defining a first coil group;
   a plurality of second coil sets defining a second coil group;
   a plurality of third coil sets defining a third coil group; and
   a switch assembly operatively connected between said input lines and said winding, said switch assembly being operatively connected to said first, second, and third coil groups so as to enable the switch operation to change current flow direction in predetermined ones of said coil sets to provide a four pole main winding and a four pole auxiliary winding in one operating position of said switch assembly, and a six pole main and a six pole auxiliary in another operating position of said switch assembly, said first, said second, and said third coil groups being arranged on said core so that the magnetic motive forces generated by said winding are symmetrically distributed for both four and six pole operation.

11. The permanent split capacitor motor of claim 10 for each of said coil groups is defined by four coil sets.

12. The permanent split capacitor motor of claim 11 wherein said stator core has thirty-six slots formed in it.

13. The motor of claim 12, wherein said motor is reversible in the four pole main winding and four pole auxiliary winding operating position of said switch.

14. The motor of claim 13, wherein said permanent split capacitor motor is applied to a washing machine, the four pole reversing position of said switch corresponding to the agitation cycle for said washing machine.

15. The motor of claim 14, wherein said switch assembly includes a plurality of mechanical switches.

16. The motor of claim 14, wherein said switch assembly includes a plurality of electronic switches.

17. The motor of claim 16 wherein said plurality of switches are arranged independently of one another.

18. The motor of claim 17, wherein the winding comprises three coil groups, each coil group having a plurality of coil sets.

19. The motor of claim 14, wherein said washing machine has a control panel, and said switch assembly forms a portion of said control panel.

20. A permanent split capacitor motor, including a stator core, the improvement comprising a winding on said core, and a switch assembly connected to said winding, said switch assembly having at least a first position and a second position and being operatively connected to said winding to provide four pole operation in at least one operative position of said switch assembly, and six pole operation in another operating position of said switch assembly, the magnetic motive force generated by said winding being generally symmetrical in both four and six pole positions of said switch.

21. The improvement of claim 20, wherein said motor is reversible in at least one operative position of said switch assembly.

22. The improvement of claim 21, wherein said switch assembly includes a plurality of mechanical switches.

23. The improvement of claim 22, wherein the winding comprises three coil groups, each coil group having a plurality of coil sets.

24. The improvement of claim 23, wherein each coil group comprises four coil sets.

25. The improvement of claim 24 adapted for use in a washing machine, said washing machine including a control, and a switch assembly forming a part of the control of said washing machine, said switch assembly including a plurality of switches.

26. The improvement of claim 25, wherein said switches included in said switch assembly arc electronic switches.

27. The improvement of claim 25 wherein said switches are arranged independently of one another.

* * * * *